UNITED STATES PATENT OFFICE.

JESSE LEWIS AND ISAAC STANWOOD, OF GLOUCESTER, MASSACHUSETTS.

IMPROVEMENT IN PURIFYING ISINGLASS.

Specification forming part of Letters Patent No. 53,636, dated April 3, 1866.

*To all whom it may concern:*

Be it known that we, JESSE LEWIS and ISAAC STANWOOD, of Gloucester, in the county of Essex and State of Massachusetts, have invented a new and useful Improvement in the Manufacture of Isinglass; and we do hereby declare that the following is a full, clear, and exact description thereof, which will enable others skilled in the art to fully understand and make use of the same.

Ordinarily isinglass is manufactured as follows: The air-bladders of the sturgeon are steeped in water, removing carefully their external coat and the blood which often covers them. They are then put into a hempen bag, squeezed and softened between the hands, and then twisted into small cylinders, which are afterward bent into the shape of a lyre; or, instead of this, the skin, the stomach, the intestines, and the swim-bladder of the sturgeon are cut into small pieces and then steeped in cold water, which may be gently heated to facilitate the solution. The jelly thus obtained is spread into thin layers to dry, when it assumes the appearance of parchment. Sometimes it is passed through suitable rollers. According to this method all the impurities contained in the swimming-bladder or other parts of fishes used in the process remain mixed with the mass, and the result is a darkish-gray opaque material very unlike the isinglass prepared by our process.

We treat the swimming-bladder or sound of hake, codfish, &c., with cold water in the ordinary manner, and then we subject the solution to a boiling heat, whereby all the scum and impurities are caused to rise to the surface, so that they can be readily removed and separated from the pure gelatine remaining in the vessel in which the operation is conducted. After all the impurities have been removed we pour the solution out and in cooling form the same into thin sheets or in any other desirable shape.

The result of this operation is a white transparent mass containing nothing but pure gelatine, and it can be used with great advantage in all branches of manufacture, when it is desirable to have perfectly pure, white, and transparent gelatine.

We claim as new and desire to secure by Letters Patent—

Separating from the swimming-bladder or sound of the hake or other fishes from which isinglass is usually prepared the impurities by boiling, substantially as and for the purpose set forth.

JESSE LEWIS.
ISAAC STANWOOD.

Witnesses:
CHARLES P. THOMPSON,
EDWARD STATEN.